United States Patent [19]

Logan et al.

[11] Patent Number: 4,991,182
[45] Date of Patent: Feb. 5, 1991

[54] OPTICAL RELAY IMAGING IN THE COMMON PASS ANNULAR LASER AMPLIFIER

[75] Inventors: Jerry D. Logan, Reseda; Thomas R. Waite, Palmdale, both of Calif.

[73] Assignee: Rockwell International Corporation, El Segundo, Calif.

[21] Appl. No.: 411,349

[22] Filed: Sep. 22, 1989

[51] Int. Cl.$^5$ ............................................. H01S 3/083
[52] U.S. Cl. ........................................ 372/94; 372/95; 372/99; 372/103; 372/108
[58] Field of Search ................................. 372/92–95, 372/99, 103, 108

[56] References Cited

U.S. PATENT DOCUMENTS

| | | | |
|---|---|---|---|
| 4,514,850 | 4/1985 | Holmes et al. | 372/95 |
| 4,516,244 | 5/1985 | Holmes | 372/99 |
| 4,598,408 | 7/1986 | O'Keefe | 372/94 |
| 4,606,036 | 8/1986 | Holmes | 372/95 |
| 4,744,090 | 5/1988 | Freiberg | 372/94 |

*Primary Examiner*—Georgia Epps
*Attorney, Agent, or Firm*—H. Fredrick Hamann; Harry B. Field; Steven E. Kahm

[57] ABSTRACT

An annular ring resonator which employs relay imaging to reduce crosstalk caused by diffusion which occurs between biconic mirrors 30 and 31 in the resonator.

5 Claims, 1 Drawing Sheet

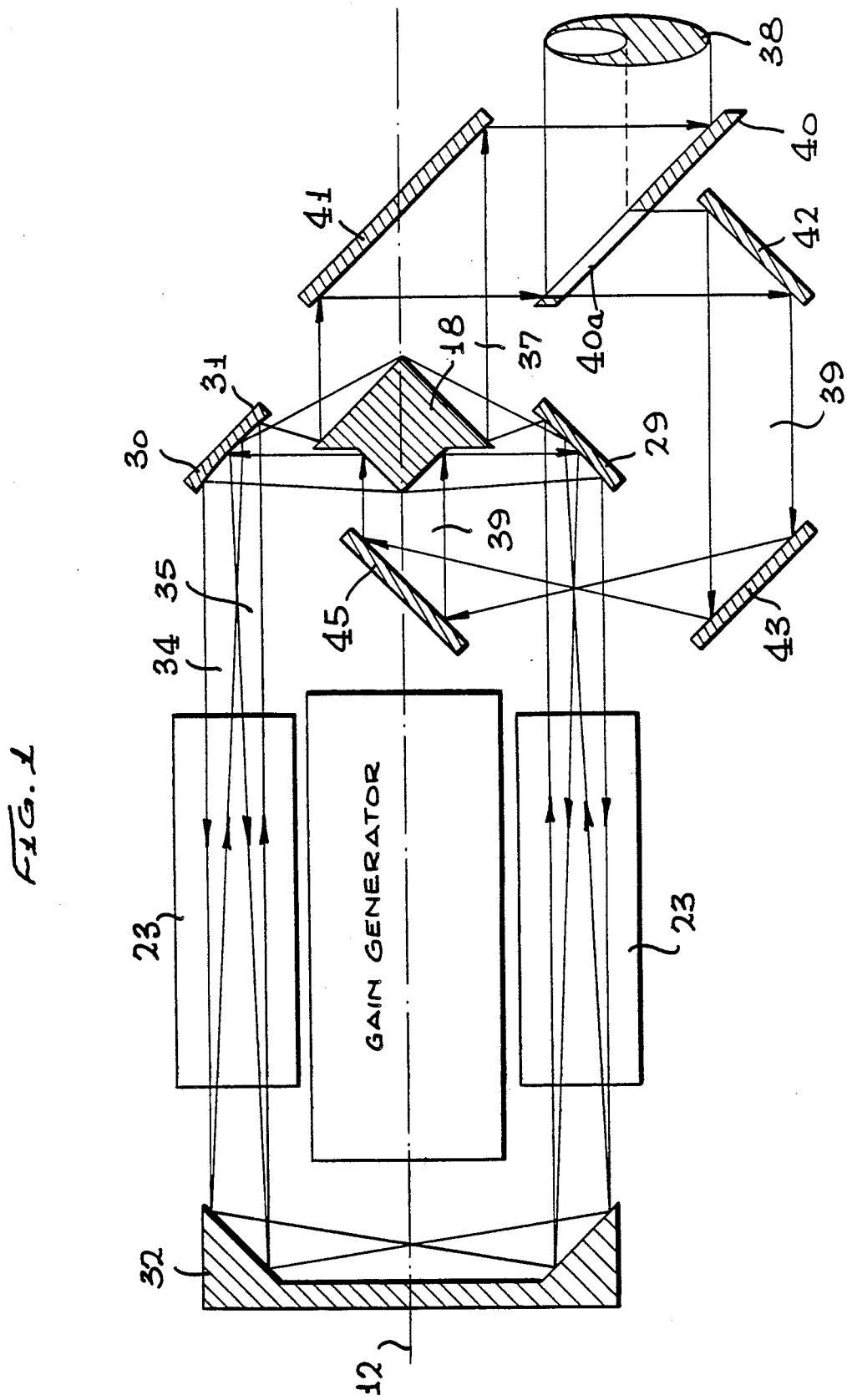

OPTICAL RELAY IMAGING IN THE COMMON PASS ANNULAR LASER AMPLIFIER

STATEMENT OF GOVERNMENT INTEREST

The Government has rights in this invention pursuant to Contract (or Grant) No. F04701-82-C-0155 awarded by the U.S. Department of the Air Force.

FIELD OF THE INVENTION

This invention relates to ring resonators for lasers and especially to relay imaging for reducing diffraction which can cause parasitic reverse modes.

BACKGROUND OF THE INVENTION

Optical resonators for lasers have typically consisted of spaced reflecting surfaces which reflect light rays repetitively through a gain region where laser pumping takes place. Energy is extracted from the resonator around the outside edge of one of the mirrors, or by providing an opening in one of the mirrors, or by partial transmission through one of the mirror surfaces so that a portion of the light rays are transmitted through or around the mirror while the remaining portion is reflected back through the gain region.

In some types of lasers it is desirable to provide a resonator in which the light rays pass through an annular cylindrical shaped gain region. This has been accomplished in the past by means of a conical mirror unit. The conical mirror unit, sometimes referred to as a W-axicon or reflaxicon, consists of a central 90° conical mirror surrounded by an outer conical mirror having a 90° conical surface. Light directed in a compact beam along the axis of the central conical mirror is reflected radially outwardly at 90° to the axis of the cone where it impinges on the conical reflecting surface of the surrounding outer conical mirror. The conical surface of the outer conical mirror in turn directs the light rays in a direction parallel to the axis of the cone within an annular cylindrical volume concentric with the axis of the cones. A rear conical ring mirror may be used at the opposite end of the annular gain media to reflect the light radially across the diameter of the cylinder to the other side of the ring where it reflects back parallel to the axis of the cone and goes back to the W-axicon.

In order to use a ring laser with an annular cylindrical gain media it is necessary for the W-axicon (or reflaxicon) to provide for separate input and output beams. The standard method is to use biconic W-axicons (or reflaxicons) with the cone angles such that the chief ray in the annular beam is not parallel to the cone axis and with some optical power (curvature) on the conical elements. The rear cone ring mirror also has optical power and small deviations from 90°. As a result, the annular input beam from one element of the biconic W-axicon diverges until it strikes the rear cone ring mirror which converts it to a converging annular beam and returns it to the output element (as opposed to the same input element) of the biconic W-axicon. As with every ring laser, there is a reverse mode which enters the annular gain media through the "output" element of the biconic waxicon and leaves through the "input" element. It is important to suppress this parasitic reverse mode. Unfortunately any "cross talk" or transfer of energy between the forward and reverse modes enhances and aggravates the reverse mode parasite. Diffraction of the beams causes some cross talk or energy transfer by spreading the annular beams so that portions of the beam intended for one of the biconic elements strikes the other closely spaced biconic element. This situation becomes more serious as the annular gain media is made thinner and longer. It limits the size and shape of the gain media in these devices.

SUMMARY OF THE INVENTION

The present invention is directed to an improved annular resonator for extracting optical power from the annular gain region. While retaining the advantages of the prior art resonators, the resonator of the present invention overcomes one of the problem areas associated with the earlier design. Specifically the problem of destructive crosstalk caused by diverging beams traveling in opposite directions reflecting from the wrong side of the biconic mirror can be reduced to near zero, thus improving the efficiency of the design and increasing the power of the resulting laser beam.

The suppression of the reverse mode caused by crosstalk is accomplished by relay imaging the beams to reduce diffraction at the biconic mirrors.

BRIEF DESCRIPTION OF THE DRAWINGS

For a better understanding of the invention, reference should be made to the accompanying drawings wherein:

FIG. 1 shows a ring resonator with a front and rear surfaced reflaxicon.

DETAILED DESCRIPTION OF THE PREFERRED EMBODIMENT

This invention relates to the use of relay imaging to suppress reverse mode crosstalk in annular ring resonators.

Referring to FIG. 1, we see a typical design for an annular ring resonator. Although the scale of the figure does not reveal it, there is curvature (optical power) on each of mirrors 18, 30, 31 and 32 and the cone angles deviate slightly from 90°.

An annular ring resonator is used in chemical lasers. The laser beams are pumped by passing a beam through a narrow annular gain volume 23 at a specified radius about a central axis 12 where stimulated emission can take place.

Each ray of light will pass through the annular gain volume twice, once while traveling away from the reflaxicon (made up of mirrors 18 and 29) and once while returning to the reflaxicon.

In order to avoid parasitic crosstalk it is important to keep the rays in beams 34 and 35 which travel in opposite directions separated as they reflect from the biconic outer conical mirror 29 which is composed of the annular input mirror 30 and the annular output mirror 31.

If rays from beams 34 and 35 are mixed together in outcoupled beam 37, then the parasitic crosstalk will be amplified because part of beam 37 will pass through the decentered hole 40a in scraper mirror 40 and will be returned to the ring resonator as feedback beam 39, which will further reduce the power output of the laser in beam 38.

The major components of the annular ring resonator are the biconic reflaxicon which is composed of a central conical mirror 18 and an outer conical mirror 29, a rear cone ring mirror 32, a scraper mirror 40 and feedback mirrors 41, 42, 43 and 45.

On examination of the reflaxicon we see that it has multiple mirrored surfaces, the central conical mirror 18 and the outer conical mirror 29. The outer conical mirror 29 is biconic having annular input mirror 30 and annular output mirror 31. The central conic mirror 18 is also biconic having an input surface facing feedback mirror 45 and an output surface facing feedback mirror 41.

The compact collimated input beam 39 from mirror 45 strikes both the left and right side of inner conical mirror 18. The resonator is a symmetric annular resonator. For simplicity we will follow the beam which strikes the left surface of the inner conical mirror 18. Its rays are reflected radially outward from the axis 12. These radial rays strike the annular input mirror 30 of the outer conical mirror 29 and are reflected to the left as an axially directed annular input beam 34. These axial rays strike the rear cone ring mirror 32 and are reflected radially inward across the axis 12 to the opposite surface of the rear cone ring mirror 32. There they are reflected to the right as an axially directed annular output beam 35. They strike the annular output mirror 31 and are reflected radially inward to the righthand surface of the central conical mirror 18 of the reflaxicon, where they are reflected to the right to mirror 41 as a compact collimated output beam 37. From there they are reflected to the output scraper mirror 40, which extracts from the resonator the outcoupled collimated beam 38 with a decentered hole. The feedback beam is the collimated input beam 39, which passes through the hole 40a in mirror 40 and is directed by feedback mirrors 42, 43 and 45 back through the resonator.

The resonator possesses a reverse mode which travels in a path opposite to that just described, except that its beams are not collimated and it does not exist over the entire annular volume. However it does exist in the portion of the gain media which generates the feedback beam for the forward mode. As a parasite, it saps power from the forward mode feedback beam. Generally suppressor mirrors are required to reduce the impact of this reverse mode parasite. The location and nature of these suppressor mirrors depend on the precise details of the resonator design and they are not shown in the figures.

The effectiveness of reverse mode suppression is greatly reduced if there is "crosstalk" or energy transfer from the forward mode to the reverse mode. The improvement in this invention over the prior art is to use relay imaging to prevent diffractive spreading of the annular beams intended for one biconical mirror from impacting the surface of the other biconic mirror.

The hole 40a in scraper mirror 40 provides hard, well defined beam edge stops. Therefore, the collimated input beam 39, passing through the scraper mirror has sharp, well defined edges. It would be beneficial to project the image of the hole 40a onto the annular input mirror 30 of the outer biconical mirror 29. By properly positioning feedback mirrors 43 and 45, and by introducing concave curvature on them so that the collimated input beam 39 is brought to a focus between them, the scraper mirror hole 40a can be relay imaged onto the annular input mirror surface 30. Consequently there will be no diffractive spreading of input beam 39 onto the annular output mirror 31, no matter how closely the two mirror surfaces are placed.

A further prevention of diffraction from the axial output beam 35 at mirror 31 onto the annular input mirror 30 can be achieved by relay imaging the sharp beam edge projected on annular input mirror 30 through the rear cone ring mirror 32 onto annular output mirror 31. This is achieved by increasing the optical power (curvature) on the rear cone ring mirror 32. That optical power is adjusted so that rays from a point on annular input mirror 30 are brought to a focus on the axis 12 at the center of the rear cone ring mirror 32. These focused rays then diverge to the rear cone ring mirror on the opposite side of the axis of the resonator where they are refocused by the rear cone ring mirror to a conjugate point on the annular output mirror 31. This point by point relay imaging of annular input mirror 30 onto annular output mirror 31, actually relay images the hard edge of the scraper mirror hole clear around the ring resonator. These relay imaging steps greatly reduce diffractive spreading from the beam directed to one element of the biconical mirrors onto the other element of the set. Crosstalk from the forward mode to the reverse mode at these critical points is reduced to a negligible level regardless of how long and thin the annular beams are required to be.

Relay imaging is based on the simple formula $$\frac{1}{L_1} + \frac{1}{L_2} = \frac{1}{f}$$

where $L_1$ and $L_2$ are the distances of the image and object plane from the optical element whose focal length is f. Therefore, the distances between the mirrors and the focal length of the mirrors may be adjusted to make the images larger or smaller as needed to keep the rays that make up the images within the boundaries of the biconic mirrors.

The ray imaging technique may be used with many different designs of annular ring resonators.

What is claimed and desired to be secured by letters patent of the United States is:

1. An annular ring resonator employing relay imaging to reduce crosstalk between the forward and reverse modes comprising:
    a ring resonator having a gain medium, a laser beam, a scraper mirror which generates a sharp edged feedback beam when the feedback beam passes through the scraper mirror, a plurality of mirrors which reflect the feedback beam so as to relay image the sharp edged feedback beam onto an annular input mirror in the ring resonator.

2. An annular ring resonator employing relay imaging to reduce crosstalk between the forward and reverse modes comprising:
    a ring resonator having a gain medium, a laser beam, a rear cone ring mirror and an outer conical mirror having an annular input mirror and an annular output mirror, the rear cone ring mirror relay images an image from the annular input mirror onto the annular output mirror.

3. An annular ring resonator employing relay imaging to reduce crosstalk between the forward and reverse modes comprising:
    a ring resonator having a gain medium, a laser beam, a scraper mirror which generates a sharp edged feedback beam when the feedback beam passes through the scraper mirror, a plurality of mirrors which reflect the feedback beam so as to relay image the sharp edged feedback beam onto an annular input mirror, a rear cone ring mirror which relay images the sharp edged feedback beam image from the annular input to an annular output mirror.

4. An annular ring resonator employing relay imaging to reduce crosstalk between the forward and reverse modes as in claim 1, where the plurality of mirrors which reflect the sharp edged feedback beam are a plurality of turning mirrors where a first mirror receives the image of the sharp edged feedback beam and reflects it to second mirror which is optically curved to relay image the sharp edged feedback beam to a third mirror which is optically curved to relay image the sharp edged feedback beam onto a fourth mirror which reflects the sharp edged feedback beam and projects an image of the sharp edged feedback beam onto the annular input mirror side of a biconic outer conical mirror in the annular ring resonator.

5. An annular ring resonator employing relay imaging to reduce crosstalk between the forward and reverse modes as in claim 3, where the plurality of mirrors which reflect the feedback beam so as to relay image the sharp edged feedback beam onto the annular input mirror consists of a plurality of turning mirrors where a first mirror receives the image of the sharp edged feedback beam and reflects it to a second mirror which is optically curved to relay image the sharp edged feedback beam to a third mirror which is optically curved to relay image the sharp edged feedback beam to a fourth mirror which reflects the sharp edged feedback beam and projects an image on the sharp edged feedback beam onto the annular input mirror side of a biconic outer conical mirror in the annular ring resonator.

* * * * *

UNITED STATES PATENT AND TRADEMARK OFFICE
CERTIFICATE OF CORRECTION

PATENT NO.  : 4,991,182
DATED       : February 5, 1991
INVENTOR(S) : Jerry D. Logan and Thomas R. Waite It is certified that error appears in the above-identified patent and that said Letters Patent is hereby corrected as shown below:

Column 4, Line 66:

after the word input insert --mirror--

Signed and Sealed this

Nineteenth Day of May, 1992

*Attest:*

DOUGLAS B. COMER

*Attesting Officer*    *Acting Commissioner of Patents and Trademarks*